United States Patent
Horiguchi et al.

(10) Patent No.: US 11,285,951 B2
(45) Date of Patent: Mar. 29, 2022

(54) VEHICLE BRAKE CONTROL APPARATUS

(71) Applicant: SUBARU CORPORATION, Tokyo (JP)

(72) Inventors: Harunobu Horiguchi, Tokyo (JP); Yuta Ishizuka, Tokyo (JP); Makoto Nakauchi, Tokyo (JP); Ryoichi Mizutani, Tokyo (JP); Masaki Sunagawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 176 days.

(21) Appl. No.: 16/843,594

(22) Filed: Apr. 8, 2020

(65) Prior Publication Data
US 2020/0398846 A1 Dec. 24, 2020

(30) Foreign Application Priority Data

Jun. 20, 2019 (JP) .............................. JP2019-114272

(51) Int. Cl.
*B60W 10/188* (2012.01)
*B60W 30/18* (2012.01)
(Continued)

(52) U.S. Cl.
CPC ......... *B60W 30/18127* (2013.01); *B60L 7/26* (2013.01); *B60T 8/17* (2013.01);
(Continued)

(58) Field of Classification Search
CPC ............... B60W 30/20; B60W 10/196; B60W 2520/105; B60W 10/188; B60W 10/192; B60W 2520/10; B60W 2710/06; B60W 2710/08; B60W 2710/18; B60L 7/26; B60T 8/17; B60T 8/173; B60Y 2300/18125

See application file for complete search history.

(56) References Cited

U.S. PATENT DOCUMENTS

| 5,967,621 A * | 10/1999 | Ito .............................. B60L 7/12 303/15 |
| 2010/0250081 A1* | 9/2010 | Kinser ...................... B60T 8/00 701/70 |
| 2021/0086622 A1* | 3/2021 | Zhang ................. B60L 15/2009 |

FOREIGN PATENT DOCUMENTS

| GB | 2498794 A | * | 7/2013 | ................ B60T 1/10 |
| JP | 2007-008238 A | | 1/2007 | |

* cited by examiner

*Primary Examiner* — Roger L Pang
(74) *Attorney, Agent, or Firm* — McDermott Will & Emery LLP

(57) ABSTRACT

A vehicle brake control apparatus includes a vibration detector configured to detect a predetermined vibration state in a frictional brake device, a power regeneration execution determination unit configured to determine, in a case where the predetermined vibration state is detected by the vibration detector, whether to permit execution of power regeneration by a power generating device or to limit the execution, a pressing force controller configured to change, in a case where the execution of the power regeneration is limited by the power regeneration execution determination unit, a pressing force of a friction material in the frictional brake device, and a driving force cooperative controller configured to adjust a driving force of a vehicle to suppress fluctuation in forward acceleration or backward acceleration of the vehicle associated with a change in the pressing force by the pressing force controller.

18 Claims, 6 Drawing Sheets

(51) Int. Cl.
*B60L 7/26* (2006.01)
*B60W 10/04* (2006.01)
*B60T 8/17* (2006.01)
*B60W 10/192* (2012.01)
*B60W 30/20* (2006.01)
*B60W 10/08* (2006.01)
*B60W 10/06* (2006.01)
*B60W 10/196* (2012.01)

(52) U.S. Cl.
CPC ............ *B60W 10/04* (2013.01); *B60W 10/06* (2013.01); *B60W 10/08* (2013.01); *B60W 10/188* (2013.01); *B60W 10/192* (2013.01); *B60W 30/20* (2013.01); *B60T 2270/604* (2013.01); *B60W 10/196* (2013.01); *B60W 2520/10* (2013.01); *B60W 2520/105* (2013.01); *B60W 2710/06* (2013.01); *B60W 2710/08* (2013.01); *B60W 2710/18* (2013.01); *B60Y 2300/18125* (2013.01)

VEHICLE BRAKE CONTROL APPARATUS

CROSS-REFERENCE TO RELATED APPLICATIONS

The present application claims priority from Japanese Patent Application No. 2019-114272 filed on Jun. 20, 2019, the entire contents of which are hereby incorporated by reference.

BACKGROUND

The disclosure relates to a vehicle brake control apparatus.

In a widely known brake device provided in a vehicle, a friction material provided to a brake pad, for example, is pressed against a rotating body called a brake rotor, for example. A frictional force is then generated between the rotating body and the friction material. A braking force is thus obtained. In such a friction type brake device, resonance may occur among components of the brake device due to an abnormality at a location of a frictional force being generated, i.e., a location of a friction material being pressed. In such a case, noise called brake squeal may occur, or vibration called brake judder may occur (Japanese Unexamined Patent Application Publication No. 2007-008238).

SUMMARY

An aspect of the disclosure provides a vehicle brake control apparatus. The vehicle brake control apparatus is provided in a vehicle. The vehicle includes a frictional brake device and a power generating device. The frictional brake device includes a rotating body and a friction material. The rotating body is rotatable together with a wheel. The friction material is to be pressed against the rotating body during braking of the vehicle. The power generating device is configured to execute power regeneration upon reception of input from the wheel. The vehicle brake control apparatus includes a vibration detector, a power regeneration execution determination unit, a pressing force controller, and a driving force cooperative controller. The vibration detector is configured to detect a predetermined vibration state in the frictional brake device. The power regeneration execution determination unit is configured to determine, in a case where the predetermined vibration state is detected by the vibration detector, whether to permit execution of the power regeneration by the power generating device or to limit the execution. The pressing force controller is configured to change, in a case where the execution of the power regeneration is limited by the power regeneration execution determination unit, a pressing force of the friction material in the frictional brake device. The driving force cooperative controller is configured to adjust a driving force of the vehicle to suppress fluctuation in forward acceleration or backward acceleration of the vehicle associated with a change in the pressing force by the pressing force controller.

An aspect of the disclosure provides a vehicle brake controlling method. The vehicle brake controlling method is used in a vehicle. The vehicle includes a frictional brake device and a power generating device. The frictional brake device includes a rotating body and a friction material. The rotating body is rotatable together with a wheel. The friction material is to be pressed against the rotating body during braking of the vehicle. The power generating device is configured to execute power regeneration upon reception of input from the wheel. The vehicle brake controlling method controls a braking force to be generated in the vehicle. The vehicle brake controlling method includes: detecting a predetermined vibration state in the frictional brake device; determining, in a case where the predetermined vibration state is detected, whether to permit the execution of the power regeneration by the power generating device or to limit the execution; changing, in a case where the execution of the power regeneration is limited, a pressing force of the friction material in the frictional brake device; and adjusting a driving force of the vehicle to suppress fluctuation in forward acceleration or backward acceleration of the vehicle associated with the change in pressing force.

An aspect of the disclosure provides a vehicle brake control apparatus. The vehicle brake control apparatus is provided in a vehicle. The vehicle includes a frictional brake device and a power generating device. The frictional brake device includes a rotating body and a friction material. The rotating body is rotatable together with a wheel. The friction material is to be pressed against the rotating body during braking of the vehicle. The power generating device is configured to execute power regeneration upon reception of input from the wheel. The vehicle brake control apparatus includes circuitry. The circuitry is configured to detect a predetermined vibration state in the frictional brake device. The circuitry is configured to determine, in a case where the predetermined vibration state is detected, whether to permit the execution of the power regeneration by the power generating device or to limit the execution. The circuitry is configured to change, in a case where the execution of the power regeneration is limited, a pressing force of the friction material in the frictional brake device. The circuitry is configured to adjust a driving force of the vehicle to suppress fluctuation in forward acceleration or backward acceleration of the vehicle associated with the change in pressing force.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the technology.

DETAILED DESCRIPTION

Figure 1:
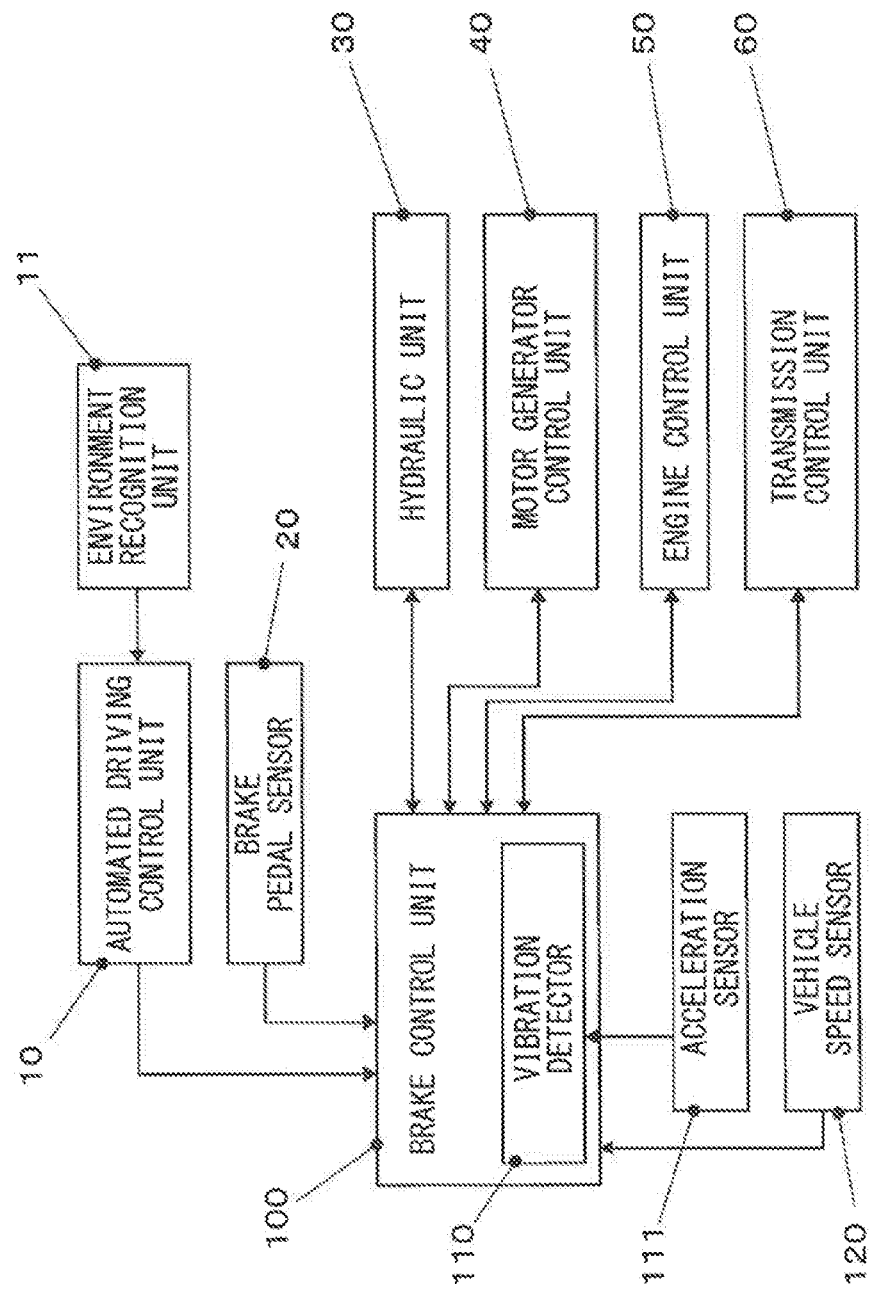
FIG. 1 is a schematic block diagram illustrating a configuration of a vehicle including a brake control apparatus according to one example embodiment of the disclosure.

In the following, an example embodiment according to the disclosure is described with reference to the accompanying drawings. Note that the following description is directed to illustrative examples of the disclosure and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description.

A brake control apparatus according to one example embodiment of the disclosure may be provided in a vehicle such as a passenger car. The vehicle may include an engine and an electric motor as drive sources in a power train. The vehicle may have an automated driving capability.

FIG. 1 is a schematic block diagram illustrating a configuration of the vehicle including the brake control apparatus according to the example embodiment.

In one embodiment, a brake control unit 100 may serve as a "vehicle brake control apparatus". In accordance with inputs (a braking request) from an automated driving control unit 10 and a brake pedal sensor 20, the brake control unit 100 may control a frictional braking force to be generated by a frictional brake device and a regenerative braking force to be generated by a motor generator. A braking force representing a sum of a frictional braking force of the frictional brake device and a regenerative braking force of the motor generator may be regarded as a braking force of the vehicle according to the example embodiment. In the example embodiment, the frictional brake device may operate in a hydraulic manner. In one embodiment, the motor generator may serve as a "power generating device". It is also possible that the motor generator be referred to as a regenerative braking device. The brake control unit 100 may include, for example, an information processor such as a central processing unit (CPU), a storage including a random access memory (RAM) and a read only memory (ROM), an input-output interface, and a bus. The bus may couple the information processor, the storage, and the input-output interface, for example. During braking where the vehicle is caused to generate a braking force, the brake control unit 100 may perform a cooperative control, together with the brake devices described above, the engine, and a transmission. This will be described later in detail.

As an environment recognition unit 11 recognizes an environment around the vehicle, the automated driving control unit 10 may generate, on the basis of the recognized environment, an automated driving scenario including a target travel path and target transition of vehicle speed of the vehicle. The automated driving control unit 10 may thus control the vehicle for acceleration, deceleration, and steering to allow the vehicle to travel in accordance with the automated driving scenario. When braking is desired, the automated driving control unit 10 may transmit a braking request to the brake control unit 100. The braking request may include information regarding target deceleration of the vehicle, for example.

The environment recognition unit 11 may use, for example, various kinds of sensors such as a stereo camera device, a monocular camera device, a millimeter wave radar device, a light detection and ranging (LIDAR) device, or a global positioning system (GPS)-based positioning device. The environment recognition unit 11 may as well use a high-precision three-dimensional (3D) map data prepared beforehand, for example. The environment recognition unit 11 may thus determine shapes of traffic lanes around the vehicle. The environment recognition unit 11 may as well detect any kind of an obstacle such as a vehicle, a pedestrian, or a building. As the environment recognition unit 11 acquires the information regarding the environment around the vehicle, the information may be transmitted to the automated driving control unit 10.

The brake pedal sensor 20 may detect, during manual traveling where the vehicle travels in accordance with a driving operation of a driver, an amount of depression of a non-illustrated brake pedal configured to input a braking operation by the driver. The brake pedal sensor 20 may be implemented by a stroke sensor, for example. An output of the brake pedal sensor 20 may be transmitted to the brake control unit 100. The brake control unit 100 may set, during manual traveling, target deceleration on the basis of an output of the brake pedal sensor 20, i.e., on the basis of an amount of depression of the brake pedal.

The brake control unit 100 may be coupled to a hydraulic unit 30, a motor generator control unit 40, an engine control unit 50, and a transmission control unit 60 directly or indirectly via an on-board local area network (LAN) device such as a controller area network (CAN) communication system. It is thus possible to perform communications with each other.

The frictional brake device may be a hydraulic type. The hydraulic unit 30 may thus generate fluid pressure for the frictional brake device. The fluid pressure may be hereinafter sometimes referred to as "brake fluid pressure". The hydraulic unit 30 may as well control the brake fluid pressure in accordance with target deceleration.

The hydraulic unit 30 may include an electric pump and electromagnetic valves. The electric pump may be configured to pressurize fluid. The electromagnetic valves may include, for example, a pressure increasing valve, a pressure regulating valve, and a pressure reducing valve. The valves may respectively be configured to separately control the fluid pressure or the brake fluid pressure in wheel cylinders provided in wheels. The wheel cylinders provided in the wheels may be respectively supplied with the fluid by the electric pump. The wheel cylinders may thus respectively press, at a pressing force in accordance with the brake fluid pressure, brake pads including friction materials against rotating bodies called brake rotors, for example, provided to be rotatable together with the wheels. The frictional brake device may therefore use a frictional force generated between each of the rotating bodies and each of the friction materials to generate a braking force, i.e., to generate a frictional braking force.

The motor generator control unit 40 may integrally control the non-illustrated motor generator and its auxiliary equipment. The motor generator may be a rotative electric machine configured to assist (driving assist) a driving force during acceleration of the vehicle, and to execute power regeneration during deceleration of the vehicle. Through power regeneration during deceleration, it is possible in the motor generator control unit 40 to assist (braking assist) a braking force.

During acceleration, the motor generator may be supplied with electric power from a non-illustrated battery to perform a driving assist. During deceleration, the motor generator may utilize input (rotational energy) from the wheels to generate electric power through power regeneration. The vehicle according to the example embodiment may be configured to be able to supply electric power generated through power regeneration to the battery. The battery may thus be charged.

The motor generator control unit 40 may control output torque of the motor generator during a driving assist. The motor generator control unit 40 may as well control regenerative torque during power regeneration, i.e., during a braking assist. The regenerative torque may correlate to a power regeneration amount. The regenerative torque may be referred to as a braking force through regenerative braking. The motor generator control unit 40 may acquire a charging state of the battery (state of charge or SOC) or information correlating to the SOC from a non-illustrated battery control unit provided to the battery. The battery control unit may include a voltage sensor configured to be able to detect a terminal voltage of the battery. It is thus possible to use an output of the voltage sensor to calculate an SOC of the battery. The acquired SOC may be transmitted to the brake control unit 100. The brake control unit 100 may determine whether to execute power regeneration (regenerative braking) on the basis of the SOC and information regarding a vehicle speed, for example. It is possible to acquire a vehicle speed from a vehicle speed sensor 120 described later.

In one embodiment, the brake control unit 100 may implement a "vibration detector", a "power regeneration execution determination unit", a "pressing force controller", a "driving force cooperative controller", a "vehicle speed acquisition unit", and a "power regeneration amount cooperative controller".

The engine control unit 50 may integrally control the non-illustrated engine and its auxiliary equipment. The engine may serve as, together with the motor generator, power sources configured to allow the vehicle to travel. It is possible to use, as the engine, for example, any kind of an internal combustion engine such as a gasoline engine or a diesel engine.

The engine control unit 50 may set request torque for the engine in accordance with a driving state. The engine control unit 50 may as well control output of the engine to allow torque actually generated by the engine to satisfy the predetermined request torque.

The transmission control unit 60 may integrally control the non-illustrated transmission and its auxiliary equipment. The transmission may change in speed the output of the engine. The transmission may then transmit the output changed in speed to the wheels. It is possible to adopt, as the transmission, for example, a chain or belt type continuously variable transmission (CVT). In the example embodiment, the transmission may serve as a starting device. With the starting device, it is possible to allow the vehicle to start from a state where a vehicle speed is zero. The transmission may include a torque converter with a lock-up clutch.

It is in here possible to cause, during deceleration of the vehicle, the brake control unit 100 to provide instructions to the engine control unit 50 and the transmission control unit 60. It is thus possible to change output torque of the engine. It is as well possible to change a gear ratio of the transmission and a lock-up state of the lock-up clutch, for example.

It is thus possible to control driving torque to be transmitted to any ones of the wheels. The driving torque may hereinafter sometimes be referred to as "creep torque". The any ones of the wheels may hereinafter sometimes be referred to as "drive wheels".

On the basis of inputs from the automated driving control unit 10 and the brake pedal sensor 20, the brake control unit 100 may provide instructions to the hydraulic unit 30 and the motor generator control unit 40. The brake control unit 100 may thus perform a cooperative control for the frictional brake device and the motor generator. It is thus possible to allow a braking force satisfying target deceleration to act on the whole vehicle.

In the example embodiment, the brake control unit 100 may operate together with the engine control unit 50 and the transmission control unit 60, in addition to the hydraulic unit 30 and the motor generator control unit 40, in a case where a predetermined vibration state occurs, such as brake squeal or brake judder, in the frictional brake device. The brake control unit 100 may thus perform a cooperative control for the frictional brake device (a pressing force of each of the friction materials), the motor generator (a power regeneration amount or regenerative torque), the engine (output torque), and the transmission (a gear ratio). Such a control may thus be executed that aims to suppress fluctuation in deceleration, as well as to mitigate a vibration state (in other words, to resolve a predetermined vibration state). This will be described later in detail.

The brake control unit 100 may include a vibration detector 110. The vibration detector 110 may be configured to detect a predetermined vibration state such as brake squeal or brake judder in the frictional brake device.

To the brake control unit 100 may be coupled an acceleration sensor 111. In a specific but non-limiting example, the acceleration sensor 111 may be coupled to the vibration detector 110. The vibration detector 110 may detect a predetermined vibration state on the basis of an output of the acceleration sensor 111. The acceleration sensor 111 may be attached to a part that would receive vibration from a source of occurrence, i.e., the frictional brake device. The acceleration sensor 111 may thus detect acceleration of the part. It is possible, for example, to attach the acceleration sensor 111 to any of hub bearing housings. The hub bearing housings may also be referred to as hub bearing knuckles. The hub bearing housings may respectively accommodate hub bearings rotatably supporting hubs to which the wheels are fastened. The hub bearing housings may also be respectively attached with the wheel cylinders of the frictional brake device.

To the brake control unit 100 may be coupled the vehicle speed sensor 120. The vehicle speed sensor 120 may output, for example, a vehicle speed signal at a frequency proportional to a rotational speed of each of the wheels. It is possible to calculate, in the brake control unit 100, a travel speed (a vehicle speed) of the vehicle on the basis of an output of the vehicle speed sensor 120.

In the example embodiment, the brake control unit 100 may execute a control described below in a case where, during automated driving of the vehicle, the vibration detector 110 detects a predetermined vibration state such as brake squeal and brake judder in the frictional brake device. The brake control unit 100 may thus suppress, or, for example, resolve the predetermined vibration state.

Figure 2:
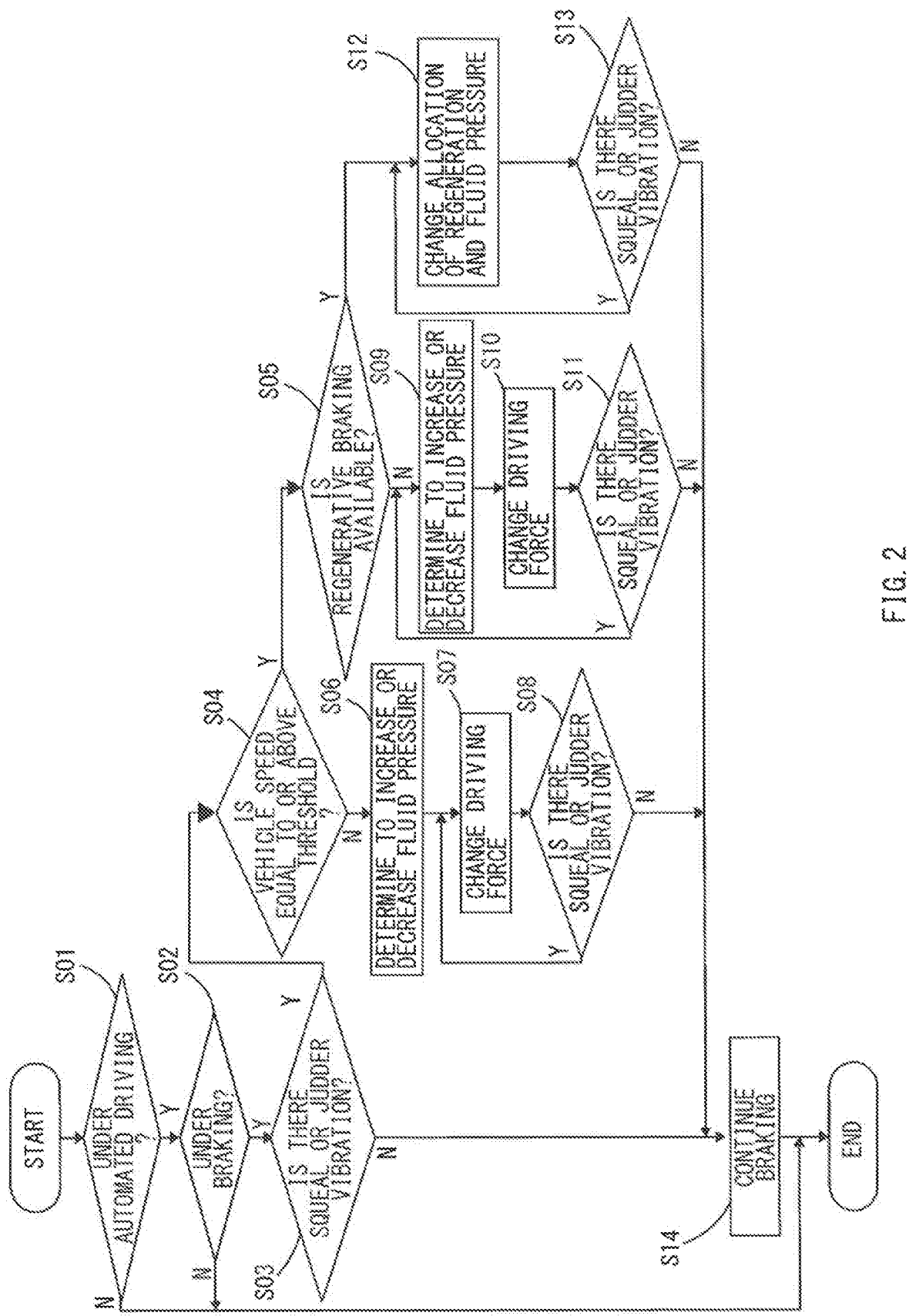
FIG. 2 is a flowchart of operation of the brake control apparatus according to the example embodiment.

FIG. 2 is a flowchart of operation of the brake control unit 100, regarding suppression of a vibration state during automated driving of the vehicle. The operation will now be described herein in an order of steps.

\<Step S01: Determination of Automated Driving\>

The brake control unit 100 may determine whether the vehicle is under automated driving. Under automated driving, the vehicle may travel in accordance with an instruction from the automated driving control unit 10. In a case where the vehicle is under automated driving (step S01: Y), the operation may proceed to step S02. In a case where the vehicle is not under automated driving, i.e., in a case where the vehicle is driven in accordance with acceleration and steering operations by the driver, for example (step S01: N), the operation may end the series of processing (may return).

\<Step S02: Determination of Braking\>

The brake control unit 100 may determine whether a braking request is received from the automated driving control unit 10. The brake control unit 100 may as well determine whether the vehicle is under a state where braking is performed. In a case where the vehicle is under braking (step S02: Y), the operation may proceed to step S03. In a case where the vehicle is not under braking, i.e., in a case where no braking request is received from the automated driving control unit 10 (step S02: N), the operation may end the series of processing.

\<Step S03: Determination of Vibration State\>

The brake control unit 100 may determine, on the basis of an output from the acceleration sensor 111, whether a predetermined vibration state (the predetermined vibration state may be, for example, brake squeal or brake judder) is occurring in the frictional brake device. In a case where it is determined that a predetermined vibration state is occurring (step S03: Y), the operation may proceed to step S04. In a case where it is determined that a predetermined vibration state is not occurring (step S03: N), the operation may proceed to step S14. In the example embodiment, it may be determined that vibration is detected upon determination that a predetermined vibration state is occurring. In one embodiment, a "vibration detector" may be implemented by the processing at step S03, as well as processing at steps S08, S11, and S13, described later.

\<Step S04: Determination of Vehicle Speed\>

The brake control unit 100 may calculate a current vehicle speed on the basis of an output of the vehicle speed sensor 120. The brake control unit 100 may then compare the calculated vehicle speed with a threshold set beforehand. For example, a vehicle speed at an allowable lower limit may be taken into account to set the threshold. At a vehicle speed below the allowable lower limit, efficiency of regeneration by the motor generator may significantly lower, making it substantially impossible to execute power regeneration. In this state, no regenerative braking may be available. It is possible to set the threshold to a speed of approximately 10 km/h, for example. In a case where a vehicle speed is equal to or above the threshold (step S04: Y), the operation may proceed to step S05. In a case where a vehicle speed is below the threshold (step S04: N), the operation may proceed to step S06 to limit execution of power regeneration by the motor generator. In the example embodiment, execution of power regeneration may be prohibited in response to determination that a vehicle speed is below the threshold.

\<Step S05: Determination of Whether Regenerative Braking is Available\>

The brake control unit 100 may acquire information regarding a current charging state (SOC) of the battery from the motor generator control unit 40. The brake control unit 100 may then determine whether it is possible to use electric power to be obtained in a case where power regeneration is executed to charge the battery. That is, the brake control unit 100 may determine whether regenerative braking is available. In a case where it is possible to charge the battery, such a state may be determined that regenerative braking is available (step S05: Y). The operation may then proceed to step S12. In a case where it is not possible to charge the battery, such a state may be determined that regenerative braking is not available (step S05: N). The operation may then proceed to step S09 to limit execution of power regeneration by the motor generator. In one embodiment, a "power regeneration execution determination unit" may be implemented by the processing at steps S04 and S05. In one embodiment, a "vehicle speed acquisition unit" may be implemented by the processing at step S04.

\<Step S06: Determination of Increasing or Decreasing Fluid Pressure\>

The brake control unit 100 may determine new brake fluid pressure that would possibly resolve the currently occurring vibration state, on the basis of, for example, preliminarily prepared data regarding a correlation between brake fluid pressure (a pressing force of each of the friction materials) of the frictional brake device and resonant frequency characteristics of a brake system. The brake control unit 100 may provide an instruction value to the hydraulic unit 30 on the basis of the determined brake fluid pressure. The brake control unit 100 may thus change brake fluid pressure to be supplied to the wheel cylinders. After that, the operation may proceed to step S07. In one embodiment, a "pressing force controller" may be implemented by the processing at step S06, as well as processing at steps S09 and S12 described later.

\<Step S07: Change of Driving Force\>

The brake control unit 100 may provide instructions to the engine control unit 50 and the transmission control unit 60. The brake control unit 100 may thus perform a driving force cooperative control. Under the driving force cooperative control, a driving force (creep torque) to be transmitted to the drive wheels may be changed. In a case where brake fluid pressure is decreased at step S06, a driving force may also be decreased at this time to suppress fluctuation in deceleration of the vehicle associated with a change in braking force. In a case where brake fluid pressure is increased at step S06, a driving force may also be increased. After that, the operation may proceed to step S08. In one embodiment, a "driving force cooperative controller" may be implemented by the processing at step S07, as well as processing at step S10 described later.

\<Step S08: Determination of Vibration State\>

The brake control unit 100 may determine whether the predetermined vibration state is still occurring. In a case where it is determined that the vibration state is still occurring (step S08: Y), the operation may return to step S07 to repeat the processing at steps S07 and S08. In a case where it is determined that the vibration state is no longer occurring (step S08: N), the operation may proceed to step S14.

Figure 3:
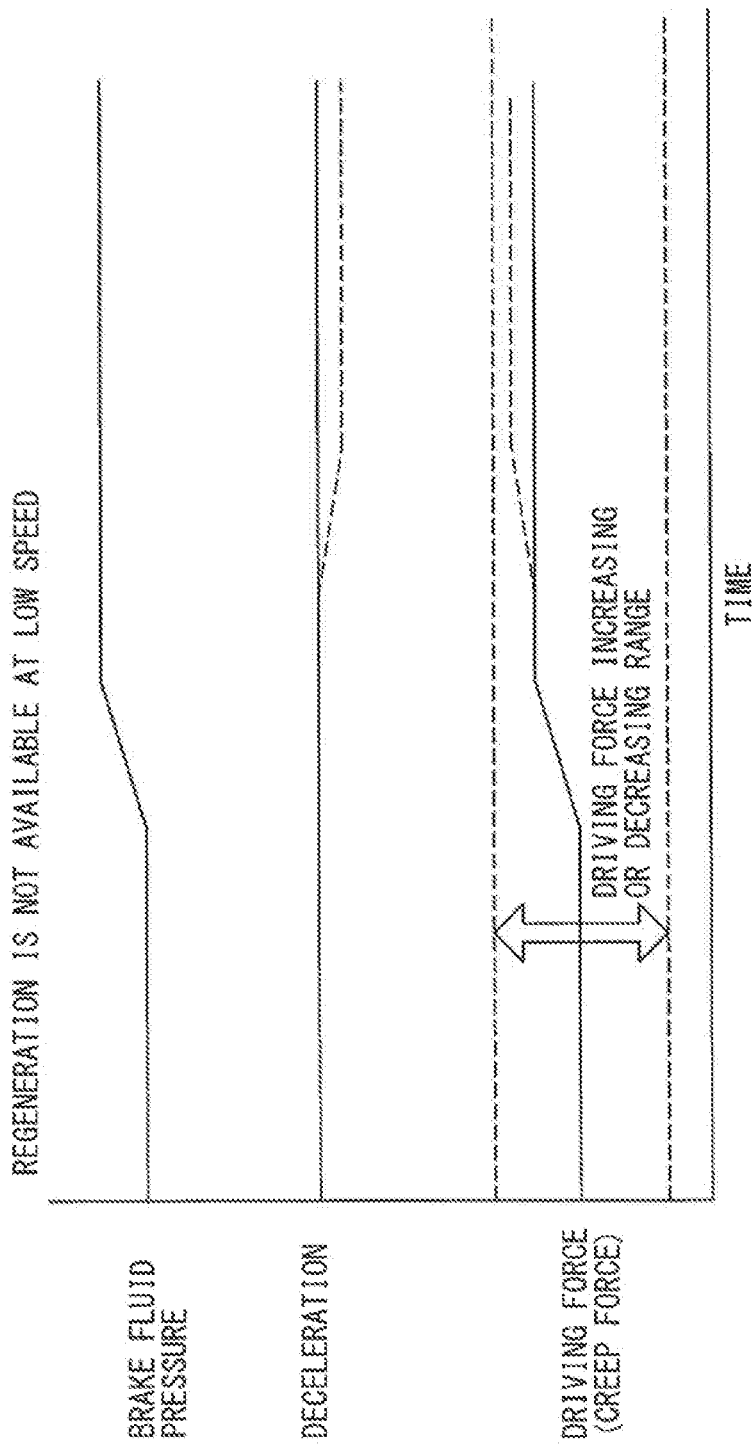
FIG. 3 is a diagram illustrating an example of transition of brake fluid pressure, deceleration, and a driving force with respect to time at a low vehicle speed where execution of power regeneration is limited, in the example embodiment.

FIG. 3 is a diagram illustrating an example of transition of brake fluid pressure, deceleration, and a driving force with respect to time at a low vehicle speed where execution of power regeneration is limited (under the processing at steps S06 to S08), in the example embodiment.

In FIG. 3, a horizontal axis illustrates time, whereas a vertical axis illustrates brake fluid pressure, deceleration, and a driving force (a creep force) of the vehicle. It is possible to read the brake fluid pressure as a pressing force of each of the friction materials or a braking force of the frictional brake device.

As illustrated in FIG. 3, for example, it is possible to achieve such a configuration that brake fluid pressure is increased in accordance with detection of a predetermined vibration state to mitigate the vibration state. It is also possible, with the configuration, to increase a driving force to prevent deceleration of the vehicle from fluctuating due to an increase in braking force. It is possible to open a throttle valve of the engine to increase output torque of the engine to increase a driving force, for example.

In a case where the vibration state is still unmitigated after that, the throttle valve may be opened, for example, in a state where the brake fluid pressure is kept constant, as illustrated with dashed lines in FIG. 3. With this operation, only a driving force may be further increased within a predetermined driving force increasing or decreasing range. The vibration state may thus be mitigated. In this case, deceleration of the vehicle may decrease due to an increase in driving force. This however may not substantially affect ride comfort, as long as fluctuation falls within such a set allowable range that an occupant such as a driver or a passenger would not feel uncomfortable. It is possible to set the driving force increasing or decreasing range on the basis of sensory evaluation, for example, from the point of view described above.

Furthermore, in a case where brake fluid pressure is changed in a low speed state, noise due to operation of the hydraulic unit 30 is likely to become problematic. It is therefore not favorable to frequently change brake fluid pressure. Such a configuration may however be applied that brake fluid pressure is further changed to prioritize mitigation of a vibration state, in a case where the vibration state is still unmitigated even though a driving force is changed to an upper limit or a lower limit of the driving force increasing or decreasing range.

Opposite to the example illustrated in FIG. 3, such a configuration may be applied that both brake fluid pressure and a driving force are decreased in accordance with detection of a predetermined vibration state.

<Step S09: Determination of Increasing or Decreasing Fluid Pressure>

The brake control unit 100 may determine new brake fluid pressure that would possibly resolve the currently occurring vibration state. The brake control unit 100 may provide an instruction value to the hydraulic unit 30 on the basis of the determined brake fluid pressure. The brake control unit 100 may thus change brake fluid pressure to be supplied to the wheel cylinders. After that, the operation may proceed to step S10.

<Step S10: Change of Driving Force>

The brake control unit 100 may provide instructions to the engine control unit 50 and the transmission control unit 60. The brake control unit 100 may thus change a driving force (creep torque) to be transmitted to the drive wheels. In a case where brake fluid pressure is decreased at step S09, a driving force may be decreased at this time to suppress fluctuation in deceleration of the vehicle. In a case where brake fluid pressure is increased at step S09, a driving force may also be increased. After that, the operation may proceed to step S11.

<Step S11: Determination of Vibration State>

The brake control unit 100 may determine whether the predetermined vibration state is still occurring. In a case where it is determined that the vibration state is still occurring (step S11: Y), the operation may return to step S09 to repeat the processing at steps S09 to S11. In a case where it is determined that a vibration state is no longer occurring (step S11: N), the operation may proceed to step S14.

Figure 4:
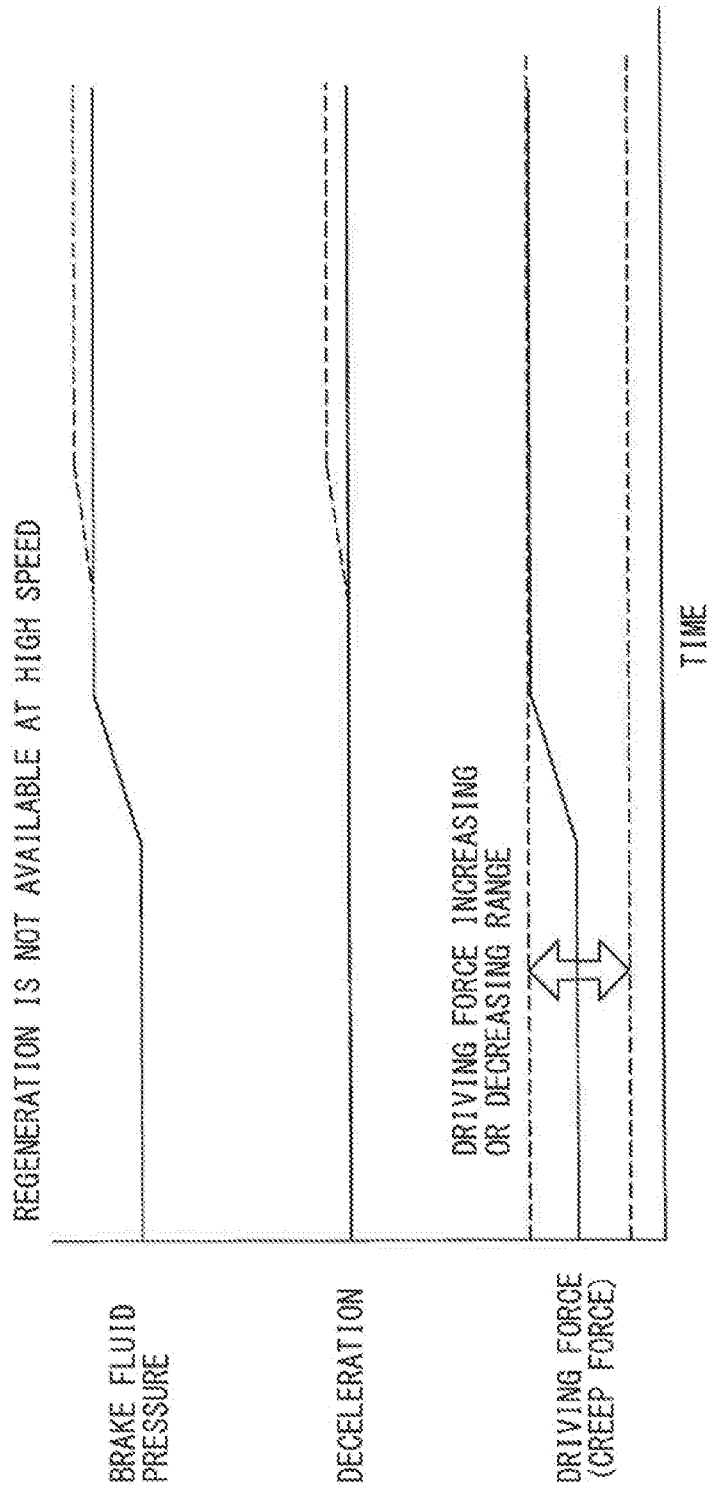
FIG. 4 is a diagram illustrating an example of transition of brake fluid pressure, deceleration, and a driving force with respect to time at a high vehicle speed and a high charging level where execution of power regeneration is limited, in the example embodiment.

FIG. 4 is a diagram illustrating an example of transition of brake fluid pressure, deceleration, and a driving force with respect to time at a high vehicle speed and a high charging level where execution of power regeneration is limited (under the processing at steps S04, S05, S09 to S11), in the example embodiment.

In FIG. 4, a horizontal axis illustrates time, whereas a vertical axis illustrates brake fluid pressure, deceleration, and a driving force of the vehicle.

As illustrated in FIG. 4, for example, it is possible to achieve such a configuration that brake fluid pressure is increased in accordance with detection of a predetermined vibration state to mitigate the vibration state. It is also possible, with the configuration, to open the throttle valve of the engine, for example, to increase a driving force to prevent deceleration of the vehicle from fluctuating due to an increase in braking force.

In a case where the vibration state is still unmitigated after that, brake fluid pressure may only be further increased, as illustrated with dashed lines in FIG. 4. The vibration state may thus be mitigated. Such a configuration may be applied that, as long as a driving force falls within the driving force increasing or decreasing range, a driving force is further increased at this time associated with an increase in brake fluid pressure to suppress fluctuation in deceleration of the vehicle. In a case where a driving force has reached the upper limit or the lower limit of the driving force increasing or decreasing range, however, the driving force may be kept constant to avoid such a situation that ride comfort is affected excessively. In this case, deceleration of the vehicle may increase due to an increase in braking force. This however may not substantially affect ride comfort, as long as fluctuation falls within the allowable range.

Opposite to the example illustrated in FIG. 4, such a configuration may be applied that both brake fluid pressure and a driving force are decreased in accordance with detection of a predetermined vibration state.

<Step S12: Change of Allocation of Regeneration and Fluid Pressure>

The brake control unit 100 may execute a control of changing a sharing ratio (hereinafter referred to as "braking force sharing ratio") between a braking force by the frictional brake device and a braking force through power regeneration by the motor generator (a braking force through regenerative braking).

In a specific but non-limiting example, new brake fluid pressure that would possibly resolve the currently occurring vibration state may be determined. Brake fluid pressure may then be newly set to a value of the new brake fluid pressure. A braking force through regenerative braking may as well be controlled to suppress fluctuation in deceleration of the vehicle associated with the change in brake fluid pressure. To suppress fuel consumption (electric power consumption) of the vehicle from being impaired in this case, a braking force through regenerative braking (a force that makes it possible to execute power regeneration) may be increased, whereas a braking force by the frictional brake device (a pressing force of each of the friction materials) may be decreased. After that, the operation may proceed to step S13. In one embodiment, a "power regeneration amount cooperative controller" may be implemented by the processing at step S12.

<Step S13: Determination of Vibration State>

The brake control unit 100 may determine whether the predetermined vibration state is still occurring. In a case where it is determined that the vibration state is still occurring (step S13: Y), the operation may return to step S12 to repeat the processing at steps S12 and S13. In a case where it is determined that the vibration state is no longer occurring (step S13: N), the operation may proceed to step S14.

Figure 5:
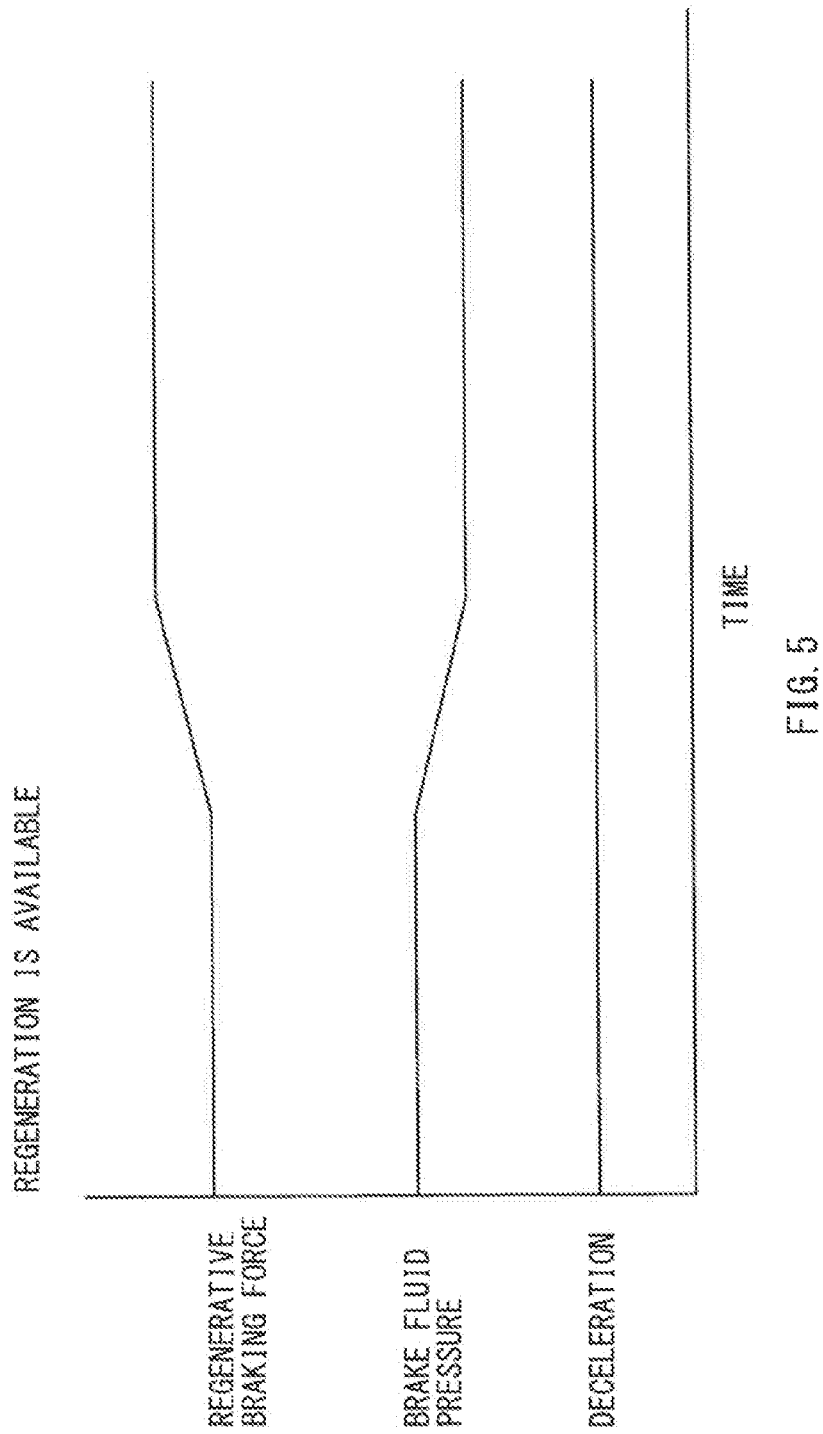
FIG. 5 is a diagram illustrating an example of transition of a regenerative braking force, brake fluid pressure, and deceleration with respect to time at a high vehicle speed and a low charging level where power regeneration is to be executed, in the example embodiment.

FIG. 5 is a diagram illustrating an example of transition of a regenerative braking force, brake fluid pressure, and deceleration with respect to time at a high vehicle speed and a low charging level where power regeneration is to be executed (under the processing at steps S04, S05, S12, and S13), in the example embodiment.

In FIG. 5, a horizontal axis illustrates time, whereas a vertical axis illustrates a regenerative braking force (a power regeneration amount), brake fluid pressure, and deceleration of the vehicle.

As illustrated in FIG. 5, for example, it is possible to achieve such a configuration that brake fluid pressure is decreased in accordance with detection of a predetermined vibration state to mitigate the vibration state. It is also possible, with the configuration, to increase a regenerative braking force to prevent deceleration of the vehicle from fluctuating due to a decrease in braking force.

Opposite to the example illustrated in FIG. 5, such a configuration may be applied that brake fluid pressure is increased in accordance with detection of a predetermined vibration state to mitigate the vibration state, as well as that a regenerative braking force is decreased. Taking into account fuel consumption (electric power consumption) of the vehicle, however, brake fluid pressure may be decreased, whereas a regenerative braking force may be increased.

Figure 6:
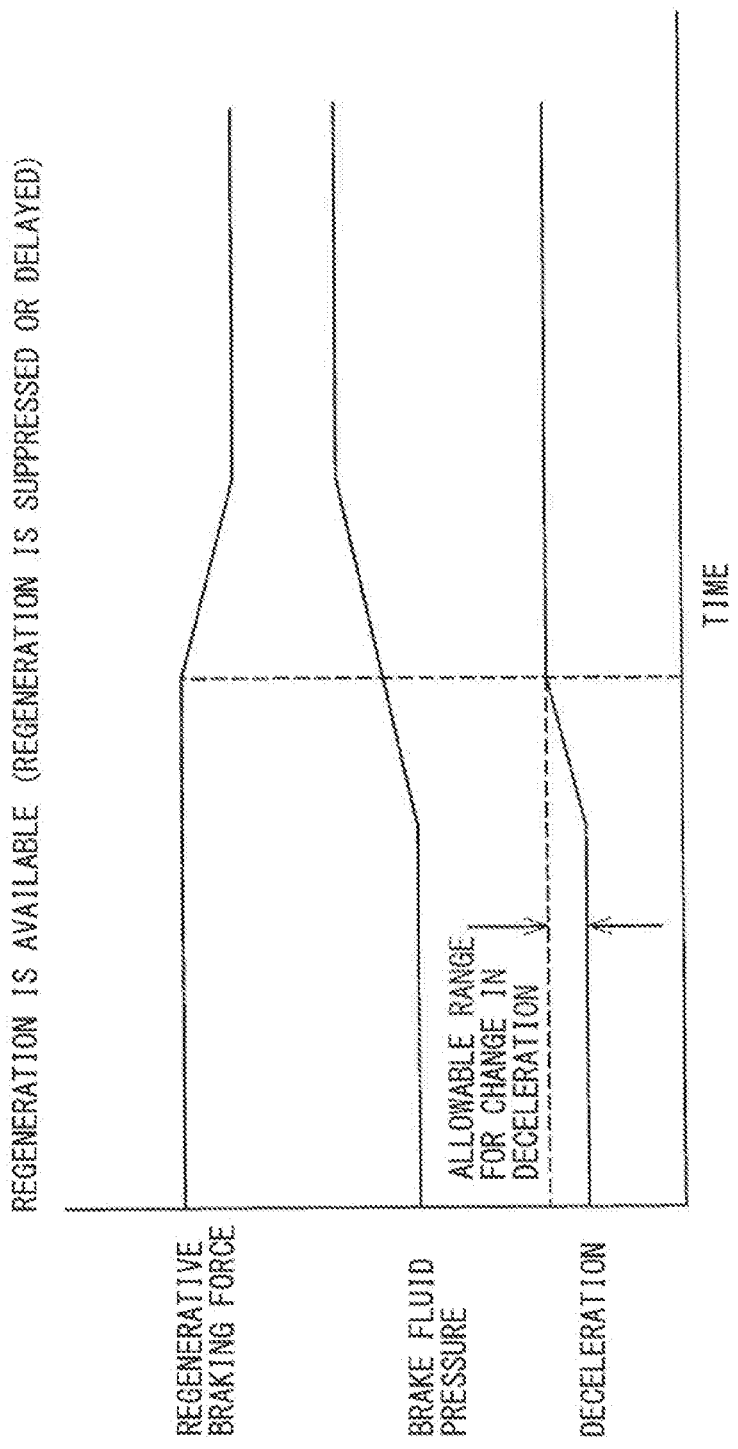
FIG. 6 is a diagram illustrating an example of transition of a regenerative braking force, brake fluid pressure, and deceleration with respect to time, in a case where fluctuation

FIG. 6 is a diagram illustrating an example of transition of a regenerative braking force, brake fluid pressure, and deceleration with respect to time, in a case where fluctuation in deceleration is allowed within an allowable range, in a modification example of the example embodiment.

As illustrated in FIG. 6, for example, it is possible to achieve such a configuration that a regenerative braking force is first kept constant, and then brake fluid pressure is increased in accordance with detection of a predetermined vibration state to mitigate the vibration state. In this case, a power regeneration amount is kept constant, making it possible to suppress fuel consumption (electric power consumption) of the vehicle from being impaired. At this time, deceleration of the vehicle may increase in accordance with an increase in brake fluid pressure. This however may not substantially affect ride comfort, as long as fluctuation falls within the allowable range.

In a case where, after that, deceleration of the vehicle reaches the upper limit of the allowable range associated with an increase in brake fluid pressure, a regenerative braking force may be decreased with respect to the further increase in brake fluid pressure. This makes it possible to control deceleration of the vehicle to be equal to or below the upper limit of the allowable range. It is possible to keep constant, on the other hand, a regenerative braking force, whereas to decrease brake fluid pressure, in response to detection of a vibration state. In this case, a regenerative braking force may be increased with respect to the further decrease in brake fluid pressure after deceleration of the vehicle has reached the lower limit of the allowable range. It is therefore possible to mitigate a vibration state through a decrease in brake fluid pressure during slow deceleration, for example. It is as well possible to maintain a distance allowing the vehicle to travel by inertia to improve fuel consumption (electric power consumption).

As described above, by changing a regenerative braking force only in a case where deceleration of the vehicle has reached the upper limit or the lower limit of the allowable range, it is possible to improve fuel consumption (electric power consumption) of the vehicle, or at least to suppress fuel consumption (electric power consumption) of the vehicle from being impaired.

<Step S14: Continuation of Braking>

The brake control unit 100 may retain the current instruction values regarding braking to the hydraulic unit 30 and the motor generator control unit 40 to keep the current braking state. A pressing force of each of the friction materials in the frictional brake device and a power regeneration amount of the motor generator may therefore be kept constant. After that, the series of processing may end.

In a case where a predetermined vibration state occurs in a state where a whole braking force is obtained through regenerative braking, its possible reason may be drag of a brake pad. Under this knowledge, a relatively weak braking force may be allowed to be generated by the frictional brake device, and a power regeneration amount may be decreased, although not described in the flowchart described above. It is therefore possible to keep constant deceleration of the vehicle.

According to the example embodiment, it is possible to achieve effects described below.

In a vehicle where it is possible to use input from wheels, to execute power regeneration, and to obtain a braking force, such a control is executed that, in accordance with a braking request, a frictional brake device and a regenerative braking device (i.e., a power generating device) cooperate with each other. In a case where, in such a vehicle as described above, noise or vibration has occurred from a source of occurrence, i.e., from the frictional brake device, in a specific but non-limiting example, in a case where brake squeal or brake judder has occurred, it is possible to change brake fluid pressure of the frictional brake device (in a specific but non-limiting example, a pressing force of each of friction materials) to an extent that such a predetermined vibration state is resolved. It is also possible to change a power regeneration amount to suppress fluctuation in deceleration of the vehicle. However, braking by a power generating device, i.e., regenerative braking, does not always work well. For example, in a case where a battery is in a state where a charging state (SOC) is already higher, and there is not an enough amount of electric power for use in charging or efficiency of regeneration is lowered significantly due to a low travel speed of the vehicle (vehicle speed), it is not possible to achieve well-working regenerative braking. If brake fluid pressure (pressing force) is forcibly changed to suppress vibration in this case, for example, it is concerned that deceleration of the vehicle changes, resulting in that an occupant feels uncomfortable. The example embodiment is provided to address such concerns as described above.

Upon occurrence of a predetermined vibration state, it is possible to suppress an occupant from feeling uncomfortable, as well as to mitigate the vibration state. In a specific but non-limiting example, a predetermined vibration state such as brake squeal or brake judder, if occurred, in the frictional brake device is detected. It is then determined whether execution of power regeneration by the motor generator is to be permitted or the execution is to be limited. In a case where execution of power regeneration is to be limited, brake fluid pressure in the frictional brake device (e.g., a pressing force of each of the friction materials respectively provided to the brake pads) is changed. Even in a case where it is not possible to execute power regeneration, or it is not favorable to execute power regeneration, it is thus possible to mitigate the vibration state. By changing a driving force of the vehicle in accordance with a change in brake fluid pressure, it is possible to suppress an occupant from feeling uncomfortable due to fluctuation in deceleration.

It is possible to improve ride comfort and a feel of comfortability in a cabin. In a specific but non-limiting example, in a case where a predetermined vibration state is continuously detected after a driving force has been changed in a low speed state where the vehicle runs at a speed having a value lower than a predetermined value, such a control is performed that only a driving force is changed without changing brake fluid pressure. Under conditions where noise associated with the vehicle itself traveling on a road is smaller, and noise and vibration generated by actuators configured to change brake fluid pressure, such as the hydraulic unit 30, are likely to become significant, it is thus possible to prevent the actuators from generating noise, for example.

It is possible to suppress the vehicle from becoming unstable due to an excessive change in driving force. In a specific but non-limiting example, in a case where a predetermined vibration state is continuously detected even though brake fluid pressure has been changed and a driving force has been adjusted until an amount of the change in the driving force reaches its limit value, in other words, until the driving force reaches the upper limit or the lower limit of the driving force increasing or decreasing range, changing of the driving force is limited (e.g., the driving force is kept constant), but the brake fluid pressure is changed. It is thus possible to avoid such an event that the driving force will be changed beyond the allowable limit of the increasing or decreasing range.

In a case where execution of power regeneration by the power generating device is permitted, it is possible to suppress an occupant from feeling uncomfortable, as well as to mitigate a vibration state, regardless of a change in driving force. In a specific but non-limiting example, in a case where execution of power regeneration is permitted when a predetermined vibration state such as brake squeal or brake judder is detected, brake fluid pressure is changed. It is thus possible to mitigate the vibration state. To suppress fluctuation in forward acceleration or backward acceleration of the vehicle, a power regeneration amount is changed. It is thus possible to suppress an occupant from feeling uncomfortable.

It is possible to decrease fuel consumption (a rate of fuel consumption) or electric power consumption (a rate of electric power consumption) of the vehicle. It is as well possible to mitigate a vibration state. In a specific but non-limiting example, in a case where it is possible to increase a power regeneration amount, brake fluid pressure is decreased, whereas a power regeneration amount is increased. It is thus possible to decrease an amount of energy to be consumed. It is possible, on the other hand, to increase an amount of energy to be regenerated. It is thus possible to improve fuel consumption or electric power consumption of the vehicle.

It is possible to further improve fuel consumption or electric power consumption of the vehicle. In a specific but non-limiting example, in a case where execution of power regeneration is permitted, brake fluid pressure is increased. It is thus possible to mitigate a vibration state. Until an amount of increase in deceleration of the vehicle reaches its limit value, in other words, while deceleration of the vehicle falls within the allowable range, a current power regeneration amount (i.e., a power regeneration amount being attained before brake fluid pressure is increased) is kept constant. It is thus possible to suppress fuel consumption or electric power consumption of the vehicle from being impaired associated with a decrease in power regeneration amount. Furthermore, in a case where, after an amount of increase in deceleration has reached the limit value, a power regeneration amount is caused to be decreased, it is possible to suppress a power regeneration amount from decreasing, because fluctuation in deceleration is allowed until a value of fluctuation reaches its limit value.

Modification Examples

The disclosure is not limited to the example embodiment described above. It is possible to variously modify or alter the disclosure. Such modification examples and alteration examples still fall within the technical scope of the disclosure.

The configurations of the brake control apparatus and the vehicle are not limited to the configurations described above. It is possible to appropriately alter the configurations. In the example embodiment described above, for example, a vibration state in the frictional brake device is mitigated during braking under automated driving. In addition to the feature described above, it is possible to utilize the disclosure to mitigate a vibration state during driving under adaptive cruise control (ACC). It is as well possible to utilize the disclosure to mitigate a vibration state in a brake-by-wire type brake device during manual driving.

In the example embodiment described above, the frictional brake device is a hydraulic type frictional brake device. In the hydraulic type frictional brake device, fluid pressure of the brake fluid (brake fluid pressure) is used to press the friction materials of the brake pads respectively against the rotating bodies (the rotors). In addition to the hydraulic type frictional brake device described above, it is possible to apply the disclosure to an electric frictional brake device. In the electric frictional brake device, an electric actuator such as an electric motor presses friction materials against rotating bodies.

In the example embodiment described above, any of the hub bearing housings is attached with the acceleration sensor. It is thus possible to detect a predetermined vibration state. A method of detecting a predetermined vibration state is not limited to the configuration described above. It is possible to appropriately alter the method of detecting a predetermined vibration state. For example, a rotational speed of each of the wheels may be used to calculate an angular speed and angular acceleration. A vibration state may thus be detected on the basis of the calculated angular speed and the calculated angular acceleration.

In the example embodiment described above, the engine-and-electric hybrid vehicle is adopted as the vehicle. In addition to the engine-and-electric hybrid vehicle, it is possible to apply the disclosure to another vehicle such as an electric vehicle including an electric motor only as a drive source (i.e., a pure EV) or a fuel-cell powered vehicle (FCV).

In a case where a vehicle applicable to the disclosure, as described above, separately includes electric motors respectively inside wheels as traveling drive sources, for example, the control according to any embodiment of the disclosure may be performed for each of the wheels. For example, in a case where a predetermined vibration state has only occurred in some of the wheels, the frictional brake device is caused to change a braking force for only the some of the wheels. To suppress fluctuation in deceleration in each of the rotating wheels associated with a change in braking force, each of the electric motors may as well be caused to change a driving force, or to change a power regeneration amount.

According to the aspect of the disclosure, as described above, it is possible to provide a brake control apparatus configured to be able to suppress an occupant from feeling uncomfortable, as well as to suppress noise or vibration from a source of occurrence, i.e., a frictional brake device, regardless of whether execution of power regeneration is permitted or limited.

The brake control unit 100 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the brake control unit 100. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and an SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of the brake control unit 100 illustrated in FIG. 1.

It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A vehicle brake control apparatus to be provided in a vehicle that includes
   a frictional brake device including a rotating body rotatable together with a wheel, and a friction material to be pressed against the rotating body during braking of the vehicle, and
   a power generating device configured to execute power regeneration upon reception of input from the wheel,
the vehicle brake control apparatus comprising:
   a vibration detector configured to detect a predetermined vibration state in the frictional brake device;
   a power regeneration execution determination unit configured to determine, in a case where the predetermined vibration state is detected by the vibration detector, whether to permit execution of power regeneration by the power generating device or to limit the execution;
   a pressing force controller configured to change, in a case where the execution of the power regeneration is limited by the power regeneration execution determination unit, a pressing force of the friction material in the frictional brake device; and
   a driving force cooperative controller configured to adjust a driving force of the vehicle to suppress fluctuation in forward acceleration or backward acceleration of the vehicle associated with a change in the pressing force by the pressing force controller.

2. The vehicle brake control apparatus according to claim 1, further comprising a vehicle speed acquisition unit configured to acquire a travel speed of the vehicle, wherein
   the pressing force controller is further configured to keep the pressing force in a case where, after the pressing force has been changed in a low speed state where the travel speed of the vehicle acquired by the vehicle speed acquisition unit is below a predetermined value, the predetermined vibration state is continuously detected by the vibration detector, and
   the driving force cooperative controller is further configured to change the driving force in response to the detection of the vibration state after the pressing force has been changed.

3. The vehicle brake control apparatus according to claim 1, wherein
   a limit value is set with respect to an amount of change in the driving force to be increased or decreased by the driving force cooperative controller,
   the driving force cooperative controller is further configured to limit changing of the driving force in a case where, after the amount of change in the driving force has reached the limit value, the predetermined vibration state is continuously detected by the vibration detector, and
   the pressing force controller is further configured to change the pressing force in a state where changing of the driving force is limited by the driving force cooperative controller.

4. The vehicle brake control apparatus according to claim 2, wherein
   a limit value is set with respect to an amount of change in the driving force to be increased or decreased by the driving force cooperative controller,
   the driving force cooperative controller is further configured to limit changing of the driving force in a case where, after the amount of change in the driving force has reached the limit value, the predetermined vibration state is continuously detected by the vibration detector, and
   the pressing force controller is further configured to change the pressing force in a state where changing of the driving force is limited by the driving force cooperative controller.

5. The vehicle brake control apparatus according to claim 1, further comprising a power regeneration amount cooperative controller, wherein
   the pressing force controller is further configured to change the pressing force in a case where execution of the power regeneration is permitted by the power regeneration execution determination unit, and
   the power regeneration amount cooperative controller is configured to adjust a power regeneration amount of the power generating device to suppress fluctuation in forward acceleration or backward acceleration of the vehicle associated with a change in the pressing force in a case where execution of the power regeneration is permitted.

6. The vehicle brake control apparatus according to claim 2, further comprising a power regeneration amount cooperative controller, wherein
   the pressing force controller is further configured to change the pressing force in a case where execution of the power regeneration is permitted by the power regeneration execution determination unit, and the power regeneration amount cooperative controller is configured to adjust a power regeneration amount of the power generating device to suppress fluctuation in forward acceleration or backward acceleration of the vehicle associated with a change in the pressing force in a case where execution of the power regeneration is permitted.

7. The vehicle brake control apparatus according to claim 3, further comprising a power regeneration amount cooperative controller, wherein
the pressing force controller is further configured to change the pressing force in a case where execution of the power regeneration is permitted by the power regeneration execution determination unit, and
the power regeneration amount cooperative controller is configured to adjust a power regeneration amount of the power generating device to suppress fluctuation in forward acceleration or backward acceleration of the vehicle associated with a change in the pressing force in a case where execution of the power regeneration is permitted.

8. The vehicle brake control apparatus according to claim 4, further comprising a power regeneration amount cooperative controller, wherein
the pressing force controller is further configured to change the pressing force in a case where execution of the power regeneration is permitted by the power regeneration execution determination unit, and
the power regeneration amount cooperative controller is configured to adjust a power regeneration amount of the power generating device to suppress fluctuation in forward acceleration or backward acceleration of the vehicle associated with a change in the pressing force in a case where execution of the power regeneration is permitted.

9. The vehicle brake control apparatus according to claim 5, wherein, in a case where execution of the power regeneration is permitted, the pressing force controller decreases the pressing force, whereas the power regeneration amount cooperative controller increases the power regeneration amount.

10. The vehicle brake control apparatus according to claim 6, wherein, in a case where execution of the power regeneration is permitted, the pressing force controller decreases the pressing force, whereas the power regeneration amount cooperative controller increases the power regeneration amount.

11. The vehicle brake control apparatus according to claim 7, wherein, in a case where execution of the power regeneration is permitted, the pressing force controller decreases the pressing force, whereas the power regeneration amount cooperative controller increases the power regeneration amount.

12. The vehicle brake control apparatus according to claim 8, wherein, in a case where execution of the power regeneration is permitted, the pressing force controller decreases the pressing force, whereas the power regeneration amount cooperative controller increases the power regeneration amount.

13. The vehicle brake control apparatus according to claim 5, wherein
a limit value is set with respect to an amount of change in forward acceleration or backward acceleration of the vehicle associated with a change in the pressing force,
the pressing force controller increases the pressing force in a case where execution of the power regeneration is permitted, and
the power regeneration amount cooperative controller is further configured to keep the power regeneration amount, the power regeneration amount being attained before the pressing force is increased, until an amount of increase in deceleration of the vehicle associated with an increase in the pressing force reaches the limit value.

14. The vehicle brake control apparatus according to claim 6, wherein
a limit value is set with respect to an amount of change in forward acceleration or backward acceleration of the vehicle associated with a change in the pressing force,
the pressing force controller increases the pressing force in a case where execution of the power regeneration is permitted, and
the power regeneration amount cooperative controller is further configured to keep the power regeneration amount, the power regeneration amount being attained before the pressing force is increased, until an amount of increase in deceleration of the vehicle associated with an increase in the pressing force reaches the limit value.

15. The vehicle brake control apparatus according to claim 7, wherein
a limit value is set with respect to an amount of change in forward acceleration or backward acceleration of the vehicle associated with a change in the pressing force,
the pressing force controller increases the pressing force in a case where execution of the power regeneration is permitted, and
the power regeneration amount cooperative controller is further configured to keep the power regeneration amount, the power regeneration amount being attained before the pressing force is increased, until an amount of increase in deceleration of the vehicle associated with an increase in the pressing force reaches the limit value.

16. The vehicle brake control apparatus according to claim 8, wherein
a limit value is set with respect to an amount of change in forward acceleration or backward acceleration of the vehicle associated with a change in the pressing force,
the pressing force controller increases the pressing force in a case where execution of the power regeneration is permitted, and
the power regeneration amount cooperative controller is further configured to keep the power regeneration amount, the power regeneration amount being attained before the pressing force is increased, until an amount of increase in deceleration of the vehicle associated with an increase in the pressing force reaches the limit value.

17. A vehicle brake controlling method for a vehicle that includes
a frictional brake device including a rotating body rotatable together with a wheel, and a friction material to be pressed against the rotating body during braking of the vehicle, and
a power generating device configured to execute power regeneration upon reception of input from the wheel,
the method controlling a braking force to be generated in the vehicle, the method comprising:
detecting a predetermined vibration state in the frictional brake device;

determining, in a case where the predetermined vibration state is detected, whether to permit execution of power regeneration by the power generating device or to limit the execution;

changing, in a case where the execution of the power regeneration is limited, a pressing force of the friction material in the frictional brake device; and adjusting a driving force of the vehicle to suppress fluctuation in forward acceleration or backward acceleration of the vehicle associated with the change in the pressing force.

18. A vehicle brake control apparatus to be provided in a vehicle that includes a frictional brake device including a rotating body rotatable together with a wheel, and a friction material to be pressed against the rotating body during braking of the vehicle, and a power generating device configured to execute power regeneration upon reception of input from the wheel, the vehicle brake control apparatus comprising circuitry configured to detect a predetermined vibration state in the frictional brake device, determine, in a case where the predetermined vibration state is detected, whether to permit execution of power regeneration by the power generating device or to limit the execution, change, in a case where the execution of the power regeneration is limited, a pressing force of the friction material in the frictional brake device, and adjust a driving force of the vehicle to suppress fluctuation in forward acceleration or backward acceleration of the vehicle associated with the change in the pressing force.

* * * * *